United States Patent [19]
Lee

[11] Patent Number: 5,208,515
[45] Date of Patent: May 4, 1993

[54] PROTECTION CIRCUIT FOR STABILIZER FOR DISCHARGE APPARATUS

[76] Inventor: Sang-Woo Lee, 187-90 Yeonhee-Dong Seodaemoon-Ku, Seoul, Rep. of Korea

[21] Appl. No.: 805,485

[22] Filed: Dec. 11, 1991

[30] Foreign Application Priority Data

Dec. 11, 1990 [KR] Rep. of Korea .................... 19770

[51] Int. Cl.[5] ........................................... H05B 37/02
[52] U.S. Cl. .................... 315/225; 315/219; 315/DIG. 7
[58] Field of Search ............... 315/225, 226, 127, 307, 315/289, 290, 291, 219, DIG. 7

[56] References Cited

U.S. PATENT DOCUMENTS

| | | | |
|---|---|---|---|
| 3,334,270 | 8/1967 | Nuckolls | 315/289 |
| 4,350,935 | 9/1982 | Spira | 315/291 |
| 4,890,041 | 12/1989 | Nuckolls | 315/225 |
| 4,962,336 | 10/1990 | Dodd | 315/290 |
| 5,023,516 | 6/1991 | Ito | 315/219 |
| 5,049,788 | 9/1991 | Lee | 315/219 |
| 5,051,661 | 9/1991 | Lee | 315/225 |

Primary Examiner—Eugene R. LaRoche
Assistant Examiner—A. Zarabian
Attorney, Agent, or Firm—Jones, Tullar & Cooper

[57] ABSTRACT

A protection circuit compatible with an electronic stabilizer of a discharge apparatus, for preventing damage to circuit elements due to an excessive voltage at the premature ignition of a discharge tube, comprises an intermittent switching circuit coupled to a thyristor for periodically turning on or off the thyristor. In the intermittent switching circuit, a first contact point of a relay switch is coupled to the cathode of the thyristor and a resistor, a condensor and a gate of a transistor are connected in parallel from a second contact point of the relay switch and a relay coil and a channel of said transistor are serially connected from the power source and a base of another transistor is coupled to a third contact point of the relay switch, said other transistor controlling the operation of a transistor which drives the discharge tube.

12 Claims, 2 Drawing Sheets

PROTECTION CIRCUIT FOR STABILIZER FOR DISCHARGE APPARATUS

BACKGROUND OF THE INVENTION

The present invention relates, in general, to a high intensity discharge lamp (hereinafter called "HID") control circuit, and more particularly to a protection circuit for a stabilizer in such a discharge lamp control circuit. Such a lamp may include a discharge tube activated by a main electrode, not necessarily having a pre-heated electrode, or may include a high-luminance discharge lamp such as a high pressure sodium lamp, a high pressure mercury lamp, or a metal halide lamp.

In recent times, HID devices have employed stabilizers which operate by means of either voltage-ignition or current-ignition but those stabilizers have defects such as high power consumption, overheating of power lines, and heavy weight. Moreover, HID devices require a delay time between the switching off of the lamp and its re-lighting, because such devices use a discharge tube which becomes heated when the lights are turned on and which cools when the lights are turned off, and lighting the lamp at a time before the discharge tube has sufficiently cooled, as in an instantaneous re-lighting, can destroy the system due to overheating. An attempt to protect such systems from such overheating is described in U.S. Pat. No. 5,051,661, wherein protection was accomplished by blocking the power to the lighting circuit from a power supply. However, once the protection circuit of this patent disables the power supply, the user must manually turn off a switch controlling the circuit, and then turn it back on to make the system operational and to activate the lighting circuit. Such an inconvenience is a barrier to utilizing such lamps, particularly in cases where the HID is used for an outdoor lamp.

SUMMARY OF THE INVENTION

Accordingly, it is an object of the present invention to provide a lighting circuit which can be automatically activated after it has been turned off, without manual operation of a switch, when the discharge tube has cooled off sufficiently. In accordance with the invention, the lighting circuit is driven at a given time interval by a timing circuit to enable the lamp, even though it has been disabled by a protection circuit, so that the circuit will be activated in accordance with the state of the discharge tube.

BRIEF DESCRIPTION OF THE DRAWINGS

Specific embodiments of the invention are described with reference to the accompanying drawings, in which.

DETAILED DESCRIPTION OF THE INVENTION

Figure 1:
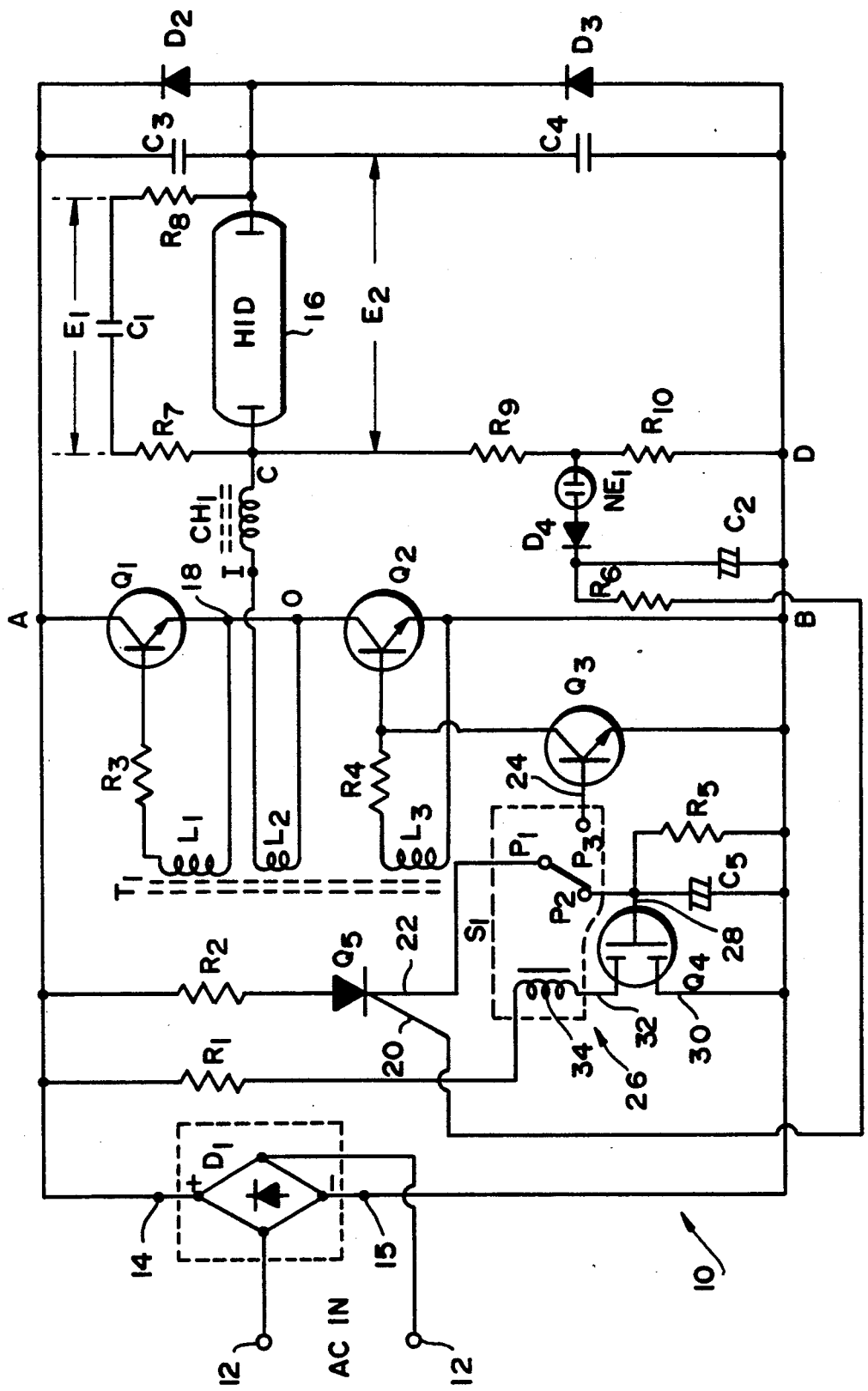
FIG. 1 is a schematic diagram of one embodiment of the invention including a protection circuit incorporating an intermittent switching circuit which consists of relay switches.

Referring now to the drawings, in which the preferred embodiments of the invention are disclosed in detail, FIG. 1 illustrates a protection circuit 10 having a known rectifier circuit D1 of high power rating located at the AC power input terminals 12. A pair of transistors Q1 and Q2 are series connected across the power output terminals 14 and 15 of the rectifier at points A and B and are alternately operated by corresponding windings L1 and L3 on a transformer T1 An HID lamp 16 is connected to transistors Q1 and Q2 by way of a serial resonant circuit which includes capacitor C1, a choke coil CH1 and a winding L2 on transformer T1, with lamp 16 being connected in parallel to capacitor C1. The serial resonant circuit is connected to one terminal 18 of inductance L1, which terminal is connected between the transistors Q1 and Q2. One terminal of inductance L2 is also connected to terminal 18 so that the serial resonant circuit C1, CH1, and L2 is connected to terminal 18 of L1.

When a lighting circuit is connected as described above, the resonant circuit can be destroyed under the condition where a power break occurs after lighting the lamp, by the premature resupply of power before the discharge lamp has sufficiently cooled. Therefore, to protect the serial resonant circuit, it is necessary to employ a power breaking protection circuit to isolate the resonant circuit from the application of an excessive voltage. This protection circuit, as illustrated in FIG. 1, includes resistors R9 and R10 serially connected between a node C and a negative power supply node D connected to terminal 15 of the rectifier D1, the node C being located between the choke coil CH1 and the HID lamp. A voltage detecting device NE1 is coupled between the resistors R9 and R10, with the output on NE1 being connected to the control terminal 20 of a thyristor Q5. The cathode 22 of thyristor Q5 is connected to the base 24 of a transistor Q3 through an intermittent switching circuit generally indicated at 26.

A relay circuit may be used as the intermittent switching circuit 26, and this relay circuit is coupled to the thyristor Q5. The switching circuit is formed by the use of a relay switch S1, as illustrated in FIG. 1. Alternatively, the thyristor Q5 can be made intermittently conductive by means of an intermittent switching circuit which consists of a DIAC D5, as illustrated in FIG. 2.

The intermittent switching circuit 26 illustrated in FIG. 1 includes a contact point P3 which is coupled to the base 24 of transistor Q3. This transistor links the base of transistor Q2 to the negative power terminal 15 of rectifier D1. Relay switch S1 also includes a contact point P1 which is coupled to cathode 22 of thyristor Q5, and further includes a contact point P2 which is connected to the gate electrode 28 of a transistor Q4. Electrode 28 is connected through a timing network which includes the parallel connection of a capacitor C5 and a resistor R5 to the negative power source 15, while the remaining electrodes 30 and 32 of transistor Q4 are connected through the coil 34 of relay switch S1 and across the DC power terminals 14 and 15 of rectifier D1.

Figure 2:
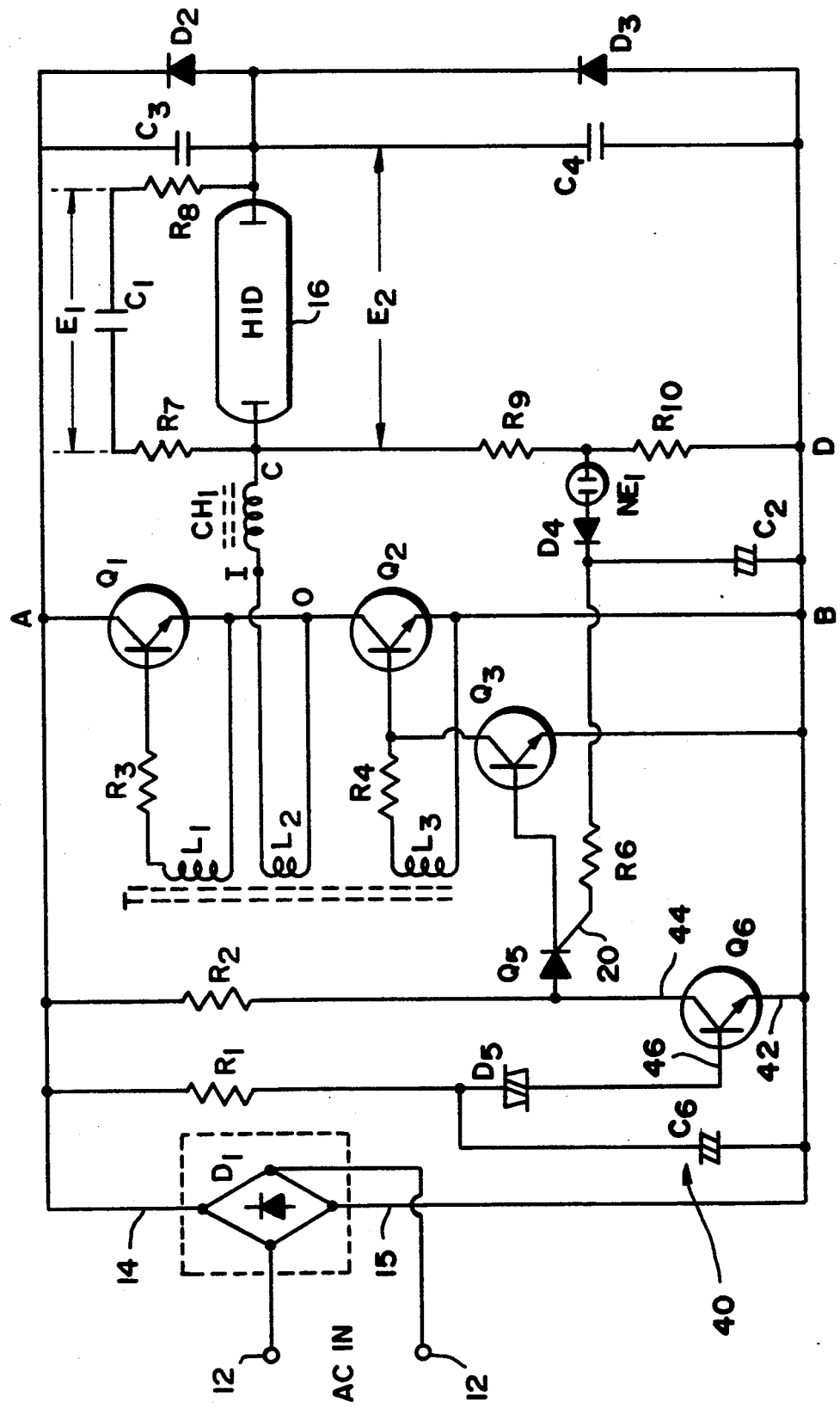
FIG. 2 illustrates a second embodiment of the invention in which the intermittent switching circuit consists of a DIAC generating an intermittent pulse by means of a resistor and capacitor.

In FIG. 2, wherein similar elements are similarly numbered, the alternative intermittent switching circuit including DIAC D5 is illustrated generally at 40. This circuit includes a transistor Q6 having its emitter 42 connected to the negative power source F15 and its collector 40 connected to the anode of thyristor Q5. One side of DIAC D5 is coupled to base 46 of transistor Q6, while a resistor R1 is coupled between the other side of DIAC D5 and the positive power source 14. A capacitor C6 is connected between the junction of resistor R1 and DIAC D5 and the negative power source 15.

The operation of the lighting circuit according to the present invention is described as follows. A DC voltage is established across the nodes A and B upon application of AC power to the input terminals 12. Transistors Q1 and Q2 are alternately conductive in response to the flux in the induction coils L1 and L3 on transformer T1, and rectangular pulses are applied through the choke coil CH1 to lamp 16.

The choke coil CH1, which has a high inductance value to the control current, forms an RLC serial resonance with the RLC circuit including resistors R7 and R8 as well as capacitor C1 and the choke coil CH1. Current flows through the RLC resonant circuit to the junction of output capacitors C3 and C4, the junction of which is also connected to lamp 16 whereby the lamp is coupled in parallel to resistors R7 and R8 and capacitor C1.

A high frequency voltage is applied to the input I of the choke coil CH1 by the activation of transistors Q1 and Q2 which enables current to flow toward the junction of C3 and C4 by way of the serial path consisting of CH1, R7, C1 and R8. During the flow of this current, CH1 and C1 are placed in a state of serial resonance to provide a voltage E1 of very high frequency whose value corresponds to the Q of the circuit and this voltage appears across capacitor C1. The voltage formed across C1 is determined by the value of resistors R7 and R8.

The voltage E1 across capacitor C1 starts the discharge through the HID lamp, with most of the current flowing not through C1, but inside the lamp 16. Because the lamp has a negative resistance characteristic, the voltage E1 abruptly decreases in accordance with the negative resistance of the lamp. When voltage E1 is equal to voltage E2, which is the voltage across the lamp itself, the voltage across C1 begins to decrease and the lamp goes on to discharge.

When a current discharge occurs in the lamp, its vapor pressure increases and with elapsing time a beam of light begins, and when the normalized condition is reached, the lighting operation is maintained. However, after the lamp has been in operation it cannot be re-lit once it is put out, until the pressure in the discharge tube becomes low enough, and this requires that the discharge tube be cooled. The time necessary to cool off the discharge lamp may vary from several seconds to several minutes, the time varying in accordance with the type of lamp or the circumstances of the temperature. If the voltage E1 across capacitor C1 should be applied for a long time while the lamp is in a non-discharging condition due to high vapor pressure or while the lamp is disconnected, the resistors R7 and R8 and condensor C1 can be broken down by this voltage. To avoid this result, the resistors R9 and R10 are serially connected between the nodes C and D. The resistances R9 and R10 form a voltage divider, and their values are selected to match the voltage at their junction (when the lamp fails to discharge) with the voltage which is required to operate the voltage detecting device NE1. Thus, while a voltage is maintained across the HID lamp, a voltage equal to the voltage E1 across capacitor C1 is also applied between the node C and the node D and as it increases, the condensor C2 begins to be charged through a diode D4 by conductance of the voltage detecting device NE1. The current from capacitor C2 is applied to the gate 20 of thyristor Q5 through the resistor R6 to enable thyristor Q5 to become conductive. The thyristor Q5 is coupled with the intermittent switching circuit 26 or 40 in FIGS. 1 or 2, respectively, of the present invention.

The intermittent switching circuit can be constructed as shown in either FIG. 1 or FIG. 2. Referring to FIG. 1, as soon as the thyristor Q5 conducts, the current from the positive power source 14 is applied to the contact point P1 belonging to the relay switch S1. In the position illustrated in FIG. 1, the contact is initially made from P1 to P2 to thereby connect the thyristor through capacitor C5 to the negative source 15. The voltage accumulated in capacitor C5 turns on transistor Q4 which enables the relay coil 34 of relay switch S1 to change the contact point from P2 to P3. When this occurs, the current through the thyristor Q5 turns on transistor Q3 to short circuit the base end emitter of Q2 and to thereby turn off transistors Q1 and Q2. As a result, the voltage across capacitor C1 goes to zero, the current applied to the voltage detecting device NE1 is interrupted and the gate voltage of thyristor Q5 is lowered to zero.

Even though current is not applied to the gate of transistor Q4 from thyristor Q5 when switch S1 is shifted to contact P3, the thyristor Q5 can hold the transistor Q3 on, because the voltage charge on capacitor C5 holds Q4 on to maintain relay coil 34 and to hold the contact between P1 and P3. As long as Q3 remains on, the short circuiting of Q2 is sustained. However, after several seconds; for example, 10 seconds, the relay switch S1 will turn off and the contact point P1 will be coupled again to contact point P2 because the charge stored in capacitor C5 will slowly bleed off through resistor R5. At this time, the lighting circuit is returned to its initial state and transistors Q1 and Q2 can be activated.

During the time that switch S1 is activated to shift the contact to P3, Q2 remains short circuited and lamp 16 cannot be reignited. The timing of the relay switch as determined by C5 and R5 is such that contact of S1 is held at P3 by the conduction of Q4 for as long as it takes for the HID lamp to cool off enough to be re-started.

In the other embodiment of the present invention as shown in FIG. 2, the conducting or nonconducting of transistor Q6, which is coupled to the anode of the thyristor Q5, controls the conductivity of transistor Q3. This switching operation is determined by the voltage applied to the base 46 of Q6 from the DIAC D5. The DIAC D5 periodically generates a voltage pulse according to the time constant of the resistor R1 and condensor C6. Accordingly, the transistor Q6 is periodically switched to its conductive state according to the voltage pulse from DIAC D5, and the thyristor Q5 is turned off when Q6 is turned on. When this occurs, Q3 is turned off and transistors Q1 and Q2 can again be activated.

If an excessive voltage from the lighting circuit appears at NE1 while the transistor Q6 and the thyristor Q5 are being alternately operated, the transistor Q5 is triggered to short circuit the transistor Q2; if that excessive voltage does not appear, the transistor Q2 can operate normally. Thus, it is seen that the alternate operation is not broken off until the HID lamp is sufficiently cool.

As described above, the present invention provides a convenient automatic switching control which operates in accordance with the condition of the HID lamp for relighting as well as insuring the stability of circuit elements such as R7, C1 and R8, by preventing them from breaking down in conditions where high vapor pressure within the HID lamp prevents discharge. Moreover, the present invention yields an efficiency to the stabilizer circuit by making it possible to use the HID lamp in safety and is an improvement over conventional stabilizer circuits of the magnetic type where a voltage or current ignition stabilizer, and can reduce the power consumption. Another advantage of the invention is that a power line is protected from being destroyed due to excessive power loading and the performance of the lamp can be advanced by operating with high frequency.

What is claimed is:

1. A protection circuit for a high intensity discharge lamp, comprising:
    a power source;
    a lighting circuit connected to said power source for igniting and maintaining an HID lamp on;
    voltage detector means coupled to said lighting circuit and producing an output when said HID lamp is off;
    a diode having an anode and a cathode, said anode being connected to said voltage detector means;
    a thyristor having a gate, an anode and a cathode, said thyristor gate being connected to said diode cathode and said thyristor anode being connected to said power source;
    a first capacitor connected to said diode cathode for controlling the conductivity of said thyristor in response to the output of said voltage detector means;
    control means responsive to the conductivity of said thyristor for switching said lighting circuit off in response to an output from said voltage detector means; and
    an intermittent switching means connected to said thyristor for automatically switching said lighting circuit on after a predetermined delay time.

2. A protection circuit according to claim 1, wherein said intermittent switching circuit comprises:
    a relay switch having three contact points, a first contact point of said switch being coupled to said cathode of said thyristor;
    a second capacitor and a gate of a first transistor connected in parallel from a second contact point of said relay switch;
    a relay coil and electrodes of said first transistor serially connected to said power source;
    said control means comprising a second transistor coupled to a third contact point of said relay switch, said second transistor controlling operation of a third transistor connected in said lighting circuit to thereby control energization of said discharge apparatus.

3. A protection circuit according to claim 1, said intermittent switching circuit including a first transistor having a collector coupled to said anode of said thyristor; a diac coupled to a base of said first transistor; a resistor connected between said diac and said power source; and a capacitor coupled to a node between said diac and resistor.

4. The protection circuit of claim 1, wherein said control means is connected to said thyristor cathode through said intermittent switching means to switch said light circuit off.

5. The protection circuit of claim 1, wherein said intermittent switching means includes:
    a timing circuit;
    relay means connected to said timing circuit, said relay means initially connecting said thyristor to said timing circuit to charge said timing circuit when said thyristor is conductive; and
    means responsive to the charging of said timing circuit to shift the connection of said thyristor from said timing circuit to said control means, said thyristor connection to said control means being disconnected upon discharge of said timing means.

6. The protection circuit of claim 1, wherein said control means is connected to said thyristor cathode.

7. The protection circuit of claim 1, wherein said control means is connected to said thyristor anode.

8. The protection circuit of claim 4, wherein said intermittent switching means is connected to said thyristor anode.

9. The protection circuit of claim 8, wherein said intermittent switching means includes means for controlling the conductivity of said thyristor.

10. The protection circuit of claim 9, further including a timing circuit connected to said means for controlling the conductivity of said thyristor for preventing said thyristor from becoming conductive for a predetermined period after it becomes nonconductive.

11. A protection circuit compatible with an electronic stabilizer for a charge apparatus, wherein an anode of a diode is coupled to an output of a voltage detecting device in a lighting circuit connected to an HID lamp and a first capacitor and a gate of a thyristor are coupled in parallel from a cathode of said diode, an anode of said thyristor being connected to a power source, said thyristor having a cathode; said protection circuit comprising:
    a relay switch having three contact points, a first contact point of said relay switch being coupled to said thyristor cathode;
    a second capacitor and a gate of a first transistor connected in parallel to a second contact point of said relay switch;
    a relay coil connected in series with electrodes of said first transistor and said power source;
    a second transistor coupled to a third contact point of said relay switch and controlling operation of a third transistor connected in said lighting circuit to control said HID lamp.

12. A protection circuit, compatible with an electronic stabilizer for a discharge apparatus, wherein an anode of a diode is coupled to an output of a voltage detecting device in a lighting circuit connected to an HID lamp and a first capacitor and a gate of a thyristor are coupled in parallel from a cathode of said diode, an anode of said thyristor being connected to a power source, said thyristor having a cathode; said protection circuit comprising:
    a first transistor having a base and having a collector coupled to said thyristor anode;
    a diac coupled to said base of said first transistor;
    a resistor connected between said diac and said power source; and
    a second capacitor coupled to a node between said diac and resistor.

* * * * *

UNITED STATES PATENT AND TRADEMARK OFFICE
CERTIFICATE OF CORRECTION

PATENT NO. : 5,208,515
DATED : May 4, 1993
INVENTOR(S) : LEE, Sang-Woo It is certified that error appears in the above-identified patent and that said Letters Patent is hereby corrected as shown below:

Claim 11, line 2 of the claim, change "charge" to --discharge--.

Signed and Sealed this

Twenty-fifth Day of January, 1994

*Attest:*

BRUCE LEHMAN

*Attesting Officer*    *Commissioner of Patents and Trademarks*